United States Patent

Newsome

[15] 3,665,656
[45] May 30, 1972

[54] WORKPIECE FEED MECHANISM

[72] Inventor: Edward M. Newsome, 25700 D'Hondt Court, Anchorville, Mich. 48043

[22] Filed: Dec. 24, 1970

[21] Appl. No.: 101,353

[52] U.S. Cl. ........................................................51/215 H
[51] Int. Cl. ...........................................................B24b 47/02
[58] Field of Search ..................................51/215 CP, 215 H

[56] References Cited

UNITED STATES PATENTS

| | | | |
|---|---|---|---|
| 1,457,603 | 6/1923 | Rankin | 51/215 H X |
| 1,733,097 | 10/1929 | Holmes | 51/215 H X |
| 2,059,895 | 11/1936 | Norton et al. | 51/215 H X |
| 2,581,928 | 1/1952 | Broden | 51/215 H X |
| 2,773,332 | 12/1956 | Buchman et al. | 51/215 H X |

*Primary Examiner*—Othell M. Simpson
*Attorney*—Cullen, Settle, Sloman & Cantor

[57] ABSTRACT

An automatic feed mechanism for conveying workpieces from a magazine to a position where they can be clamped between two rotatable spindles of a machine tool comprises a reciprocating workpiece carrier which moves radially relative to the spindle axis. In a first or loading position of the carrier, a workpiece retaining notch is aligned with the magazine to pick up a workpiece, and the carrier is movable forwardly toward a clamping position where the workpiece is placed into position between the temporarily axially separated spindles to be clamped therebetween. Means are also provided to assure that the workpiece and the machine tool are in a predetermined angular registry at the time of clamping.

9 Claims, 4 Drawing Figures

Patented May 30, 1972 3,665,656

INVENTOR.
EDWARD M. NEWSOME.
BY
CULLEN, SETTLE, SLOMAN & CANTOR.
ATT'YS.

INVENTOR.
EDWARD M. NEWSOME.
BY
CULLEN, SETTLE, SLOMAN & CANTOR.
ATT'YS.

WORKPIECE FEED MECHANISM

DETAILED DESCRIPTION OF THE DRAWINGS

Figure 1:
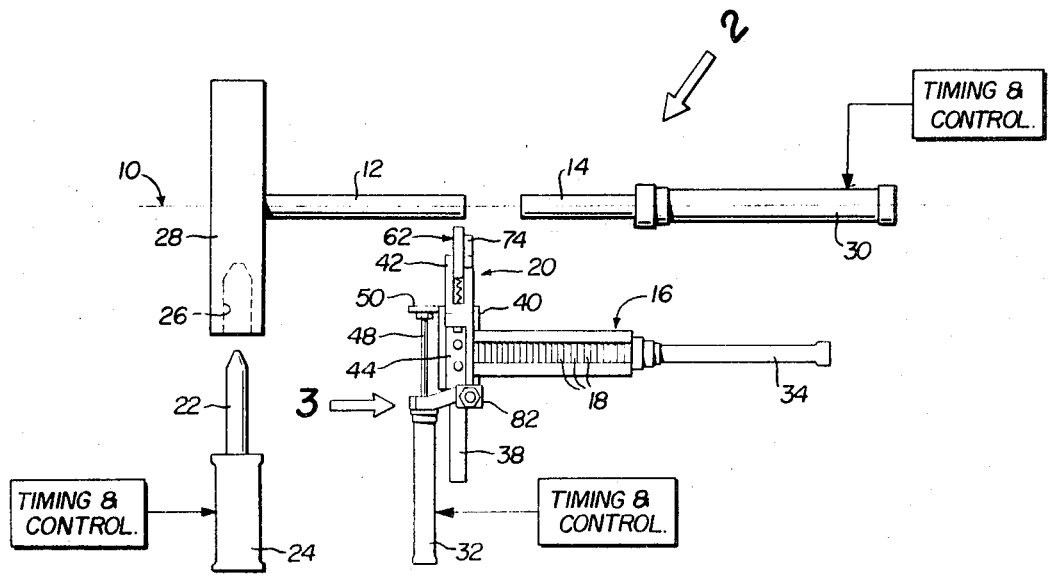
FIG. 1 is a simplified and partially schematic plan view of a grinding machine employing the improved workpiece feed mechanism of this invention.

Referring in particular to FIG. 1, center line 10 represents the spindle axis of a grinding machine employed for finish grinding cutting tool inserts. However, the unique automatic workpiece feed mechanism described herein is applicable to a wide variety of machining operations where repetitive operations are to be employed on a large number of identical workpieces. This feed mechanism is particularly useful where it is essential to orient the workpiece in a predetermined manner when it is clamped into the machine. The disclosed feed mechanism was designed for use in a grinding machine wherein the workpiece being operated upon is angularly and coaxially aligned with a cam which is engaged by a tracer or follower wheel mounted coaxially with the grinding disk. The cam thus serves as a pattern for the desired final contour and dimension of the workpiece. It is therefore essential that the workpiece being operated upon be loaded into the machine in exactly the same angular orientation as is the cam at the time of loading.

The workpiece clamping and feed mechanism of the present invention generally comprises first and second rotatable spindles 12 and 14, a magazine assembly 16 for storing a plurality of identical workpieces 18 and a workpiece carrier assembly 20 for conveying workpieces forwardly from magazine 16 to workpiece clamping spindles 12 and 14.

As is shown in greater detail in FIGS. 2-4, workpiece 18 selected for illustration in the present example is triangular in shape, although it is understood that workpieces of any shape can be processed by the present feed mechanism with appropriate modification of the shape of certain components to be described below. Since the workpiece is non-circular in shape, it is essential that it be oriented in precisely the same angular position as the cam (unillustrated) mounted on the same spindle axis.

For that purpose, pin 22 is provided for selective engagement with a radially extending hole 26 in the edge of wheel 28 fixed to spindle 12. Appropriate timing and control mechanisms are provided (schematically illustrated in FIG. 1) to actuate air cylinder 24 to bias the tapered tip of pin 22 against the periphery of wheel 28 while the grinder rotates through a slow speed hunt cycle at the start of the workpiece loading step. Wheel 28 continues to slowly turn until hole 26 passes under pin 22, at which time pin 22 is driven into the hole and firmly locked therein by cylinder 24. To prevent backlash from the necessarily oversize internal diameter of hole 26, the inner end of the hole has a carefully machined conical taper to precisely match the tapered tip of pin 22. Hence, precise angular positioning is achieved by the cooperation of these two matching conical surfaces.

A further air cylinder 30 is provided with accompanying timing and control circuitry for regulating the axial or longitudinal position of movable spindle 14. Spindle 14 is shown withdrawn in FIG. 1, to permit loading of a workpiece. When the workpiece is properly positioned between spindles 12 and 14, cylinder 30 is actuated to extend spindle 14 and frictionally clamp workpiece 18 between spindles 12 and 14, as will be described below.

Movement of workpiece carrier assembly 20 between its withdrawn loading position (shown in FIG. 4) and its extended clamping position (shown in FIGS. 2 and 3) is controlled by a third cylinder 32. Carrier 20 is shown in an intermediate position in FIG. 1.

The horizontally arranged stack of workpieces 18 in fixed magazine 16 is continuously biased toward carrier assembly 20 by a fourth air cylinder 34. While cylinders 24, 30, 32 and 34 have all been disclosed as air cylinders, other actuating means such as hydraulic cylinders or solenoids could be employed if desired. Appropriate timing and control devices, including limit switches and so forth, are provided for actuating each of the four described cylinders in proper sequence, such mechanisms being well known to those skilled in this art and therefore not described herein.

Figure 2:
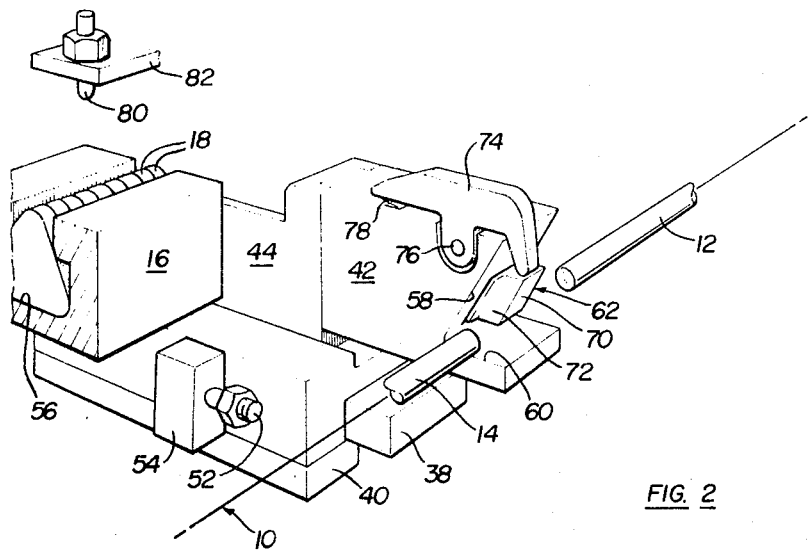
FIG. 2 is a perspective view of the mechanism of FIG. 1, viewed in the direction of arrow 2.
Figure 3:
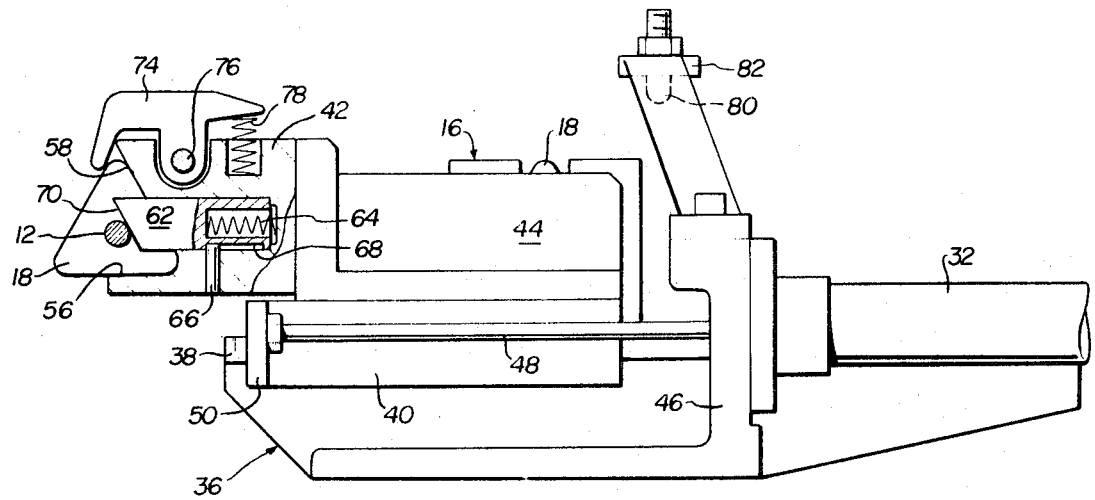
FIG. 3 is a side elevation of the feed mechanism of FIG. 1, viewed in the direction of arrow 3, and illustrating the mechanism in its extended workpiece-clamping position.
Figure 4:
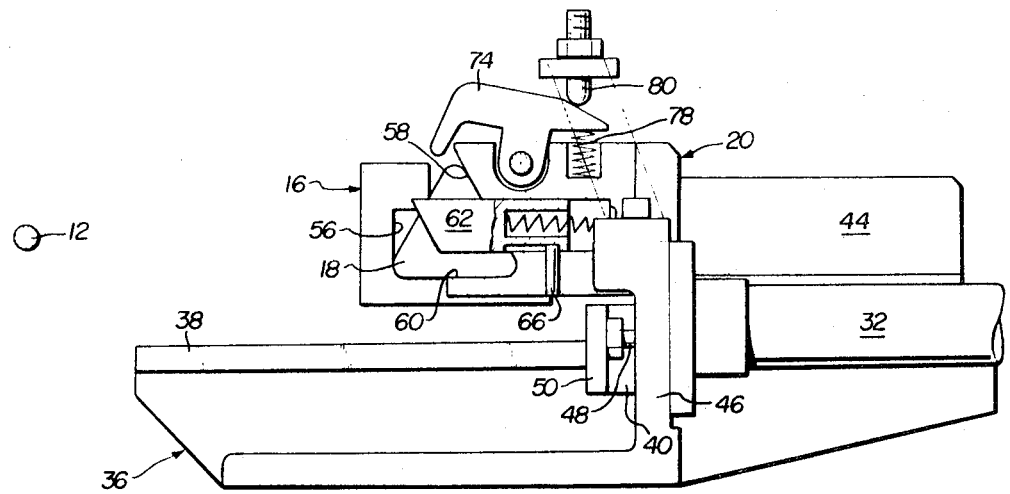
FIG. 4 is a side elevation similar to FIG. 3, but showing the feed mechanism in its withdrawn workpiece-loading position.

Referring now to FIGS. 2-4, the feeder mechanism is mounted upon a fixed feeder base 36 mounted on the grinding machine in fixed relation to spindle axis 10. Guide rail 38 forms a portion of feeder base 36, and functions in conjunction with slotted base 40 of carrier assembly 20 to control the path of reciprocation of carrier 20. The forward portion of carrier 20 comprises a separate part-holding head 42 which is removably attached to main body 44 of the carrier so that the head may be replaced when a workpiece having a different contour is to be processed by the machine. Appropriate means, such as slotted mounting holes, permit the elevation of head 42 relative to main body 44 and spindle axis 10 to be controlled to assure proper positioning of a workpiece between spindles 12 and 14. Similar means are provided between body 44 and base 40 to adjust the radial position relative to axis 10.

Feeder base 36 further comprises a vertical flange 46 upon which is rigidly mounted carrier actuating cylinder 32. The outer end of rod 48 of cylinder 32 is connected to boss 50 on carrier base 40, so that extension and retraction of cylinder rod 48 causes reciprocation of carrier assembly 20. Forward motion of the carrier assembly toward spindle axis 10 is limited by adjustable stop 52 which engages boss 54 on carrier base 40. A similar stop and boss (unillustrated) is provided for limiting the rearward withdrawal of carrier assembly 20.

Magazine 16 has a contoured slot 56 (see FIGS. 2 and 4) appropriately shaped to snugly retain the stack of workpieces 18. Magazine 16 is constructed and mounted on feeder base 36 or other fixed structure to permit easy removal and replacement for use with workpieces of different shapes. The cylinder rod (unillustrated) of magazine cylinder 34 has an appropriately shaped workpiece pusher (also unillustrated) which is removably mounted for exchange when differently shaped workpieces are to be loaded in the magazine. The pusher engages the workpiece nearest cylinder 34 and thereby exerts a continuous light force on the stack of workpieces, pushing them toward carrier 20.

Head 42 of workpiece carrier assembly 20 has a workpiece-receiving recess having edges 58 and 60 contoured to correspond with two sides of the triangular outline of workpiece 18. The rear side of such recess, that is, the side opposite to workpiece magazine 16, is defined by retractable workpiece back-up slide 62 which is biased forwardly toward spindle axis 10 by compression spring 64. Movement of slide 62 relative to head 42 is limited by fixed pin 66 in head 42 which rides in longitudinal slot 68 in the bottom of slide 62. The leading edge of slide 62 has an inclined spindle-engaging front face 70, while the side of slide 62 facing magazine 16 has a notch 72 for a purpose to be described below.

Workpieces are removably retained within this recess in head 42 by part lock 74 pivotally mounted on pin 76 at the top of head 42. Part lock 74 is biased in a counterclockwise direction (as viewed in FIG. 3) by compression spring 78. Thus, the forward lower portion of part lock 74 is biased to engage and press rearwardly and downwardly on a workpiece 18 to firmly but removably retain the workpiece against edges 58 and 60 of the recess. As best shown in FIG. 4, releasing screw 80 mounted in bracket 82 on feeder base 36 cams part lock 74 to a workpiece-releasing position when carrier 20 is in its retracted position.

OPERATION

When the grinding machine has completed its operation on a workpiece and the timing and control circuitry has caused cylinder 30 to retract movable spindle 14 and release the workpiece, the machine goes through a slow speed hunt cycle as described above until pin 22 locks wheel 28 in the desired angular position. This assures that the cam (unillustrated) which serves as a pattern will have the same angular orientation as the newly loaded workpiece. At that time, the feed mechanism is ready to load a new workpiece between spindles 12 and 14.

Assuming that a workpiece 18 is already retained in the recess of head 42 of workpiece carrier 20, the timing and control circuitry actuates cylinder 32 to drive carrier 20 forward toward spindle axis 10. As carrier 20 moves forwardly, front face 70 of retractable slide 62 engages spindle 12. Slide 62 must thereafter remain stationary during continued advancement of carrier 20 toward forward stop 54, with spring 64 being compressed by this relative movement. When carrier assembly 20 reaches stop 54, workpiece 18 is in its proper radial and elevational position for clamping between spindles 12 and 14. The control circuitry may then activate cylinder 30 to extend movable spindle 14 to clamp the workpiece. Once the workpiece is clamped between the spindles, the control circuitry then activates cylinder 32 to retract carrier 20 to its withdrawn position shown in FIG. 4. As carrier 20 starts to withdraw, the clamped workpiece itself cams part lock 74 out of its retaining position.

Slide 62 thus serves as a temporary seat to aid in firmly retaining a workpiece in head 42 as it is carried from magazine 16 to spindle axis 10. It provides broad support during loading of the workpiece from the magazine, but retracts when necessary to permit spindle 12 to engage the central portion of one of the two opposed faces of the workpiece.

As best shown in FIG. 2, slide 62 has a notch 72 at the forward end of the side face which engages the workpiece. As will be best understood from FIG. 1, this notch functions to permit leftward movement of the workpiece if necessary during clamping in the event that there is excessive lateral gap between the clamping end face of spindle 12 and the left face of the workpiece. Otherwise, such a gap could cause the workpiece to become cocked at an angle by the leftward movement of movable spindle 14. Instead, by the provision of notch 72, the workpiece will be merely shifted sideways toward spindle 12 and into notch 72 by advancement of movable spindle 14. As will be understood by a comparison of FIGS. 2 and 3 with FIG. 4, notch 72 is only aligned with the workpiece when slide 62 has been forced backward into head 42 by spindle 12.

Workpieces are loaded from magazine 16 into carrier 20 immediately upon the return of empty head 42 of the carrier to its withdrawn position of FIG. 4. The endmost workpiece in the magazine stack bears against the side face of carrier main body 44 and head 42 i.e., the right face as viewed in FIG. 1) during the reciprocation of carrier 20. As carrier 20 approaches its withdrawn position, releasing screw 80 cams part lock 74 to a workpiece-releasing position, to permit insertion of a new workpiece into the fully exposed recess in head 42. When the carrier is in its fully withdrawn position as shown in FIG. 4, the recess in head 42 comes into alignment with the stack of workpieces in magazine 16 and the light continuous biasing force from cylinder 34 forces the endmost workpiece of the stack into the recess of head 42 until it bottoms against back-up slide 62. Upon initial subsequent forward movement of carrier 20, part lock 74 is released from the influence of screw 80 and drops into clamping position against the forward edge of retained workpiece 18.

Thus, the above described feed mechanism assures that a series of workpieces will be automatically conveyed to the clamping spindles in proper radial, angular and elevational position. Furthermore, the mechanism is sufficiently flexible to adapt to a variety of sizes and shapes of workpieces. The carrier could also be employed without a magazine, if desired, with workpieces being manually loaded into head 42. The carrier, either with or without the magazine, could be used to convey workpieces to a different type of machine tool having workpiece-retaining means other than opposed spindles.

This invention may be further developed within the scope of the following claims. Accordingly, the above specification is to be interpreted as illustrative of only a single operative embodiment of this invention, rather than in a strictly limited sense.

I now claim:

1. In a machine tool wherein a workpiece to be operated upon is to be clamped into the tool in a predetermined position and orientation, the improved feed mechanism for conveying a workpiece to the clamping position in the desired position and orientation comprising:

a workpiece transporting carrier mounted on the tool for movement between a loading position, where a workpiece is loaded into said carrier, and a clamping position, where a workpiece is clamped into the machine tool;

workpiece retaining means forming a portion of said carrier for releasably retaining a workpiece in a predetermined position and orientation, said retaining means comprising a workpiece-receiving recess contoured to engage a portion of the workpiece sufficient to fix the workpiece in the desired position and orientation, one side of said recess being bounded by a retractable slide normally biased to enclose said one side of said recess to support and position a workpiece, said slide being movable to a retracted position in response to engagement with a portion of the machine as the carrier approaches the clamping position to expose said one side of said recess to expose the workpiece to a portion of the clamping mechanism of the machine tool.

2. The feed mechanism of claim 1 which further comprises:

a workpiece-holding magazine fixed to the tool for storing a stack of workpieces and including a workpiece biasing means for exerting a force on said stack toward a workpiece loading end, said loading end of said magazine being positioned adjacent said workpiece-receiving recess of said carrier when said carrier is in its loading position, and said magazine lying on the opposite side of said recess from said retractable slide so that said slide functions as a seat against which a workpiece bottoms as it is forced into said recess from said magazine by said biasing means;

and carrier actuating means mounted on the tool for causing said carrier to move between its loading and clamping positions on predetermined signals.

3. In a machine tool wherein opposed faces of a workpiece to be operated upon are clamped between a pair of axially aligned rotatable spindles, one of which is longitudinally movable between an advanced workpiece-clamping position and a retracted workpiece-releasing position, the improved feeding mechanism for automatically feeding workpieces into a predetermined radial and angular orientation with the axis of the spindles, comprising:

a workpiece transporting carrier slidably mounted on the tool for reciprocation along an axis perpendicular to the spindle axis between a loading position, where a workpiece is loaded into said carrier, and a clamping position, where a workpiece is engaged and clamped between the machine tool spindles;

carrier reciprocating means mounted on the tool and connected to said carrier for reciprocating said carrier between said loading and clamping positions upon predetermined signals;

workpiece retaining means forming a portion of said carrier for releasably retaining a workpiece in the predetermined angular orientation as it is carried from said loading position to the desired clamping position relative to the spindle axis;

said workpiece retaining means portion of said carrier comprising a workpiece-receiving recess which is fully open on a first side located on the same side of said carrier as said longitudinally movable spindle, said recess being normally closed on the opposite side by a retractable slide, said retractable slide being slidably mounted on said carrier in a direction parallel to the path of movement of said carrier and biased toward the recess-closing position, said retractable slide serving as a seat against which a workpiece bottoms as it is loaded into said recess, said recess having edges contoured to engage a portion of the circumferential edges of a workpiece to maintain the desired angular orientation of the workpiece;

advance of said carrier towards said spindles causing said retractable slide to engage the stationary spindle and to retract into said carrier upon continued advance of said carrier to expose said opposite side of said recess, whereby the opposite faces of the workpiece become sufficiently exposed to permit clamping engagement between the spindles upon advance of said movable spindle to its workpiece clamping position.

4. The feeding mechanism of claim 3 which further comprises:

a workpiece-holding magazine fixed to the tool for storing a plurality of workpieces in face to face relationship in a stack whose axis is parallel to but displaced from the axis of the machine tool spindles, said magazine including means for maintaining the workpieces in a predetermined angular orientation relative to the spindles, said magazine being positioned on the same side of a workpiece clamped between the spindles as is the longitudinally movable spindle, the magazine including biasing means for biasing said stack toward a workpiece loading end;

said fully open first side of said recess facing said magazine, and said carrier being positioned in its loading position to place said recess immediately adjacent said workpiece loading end of said magazine stack so that said magazine biasing means will cause the endmost workpiece of the stack to be loaded into said recess when said carrier reaches its loading position.

5. The feeding mechanism of claim 3 wherein said carrier is further provided with a yieldable workpiece locking member normally biased toward a position to firmly engage the edge of a workpiece which faces forwardly toward the spindle axis, which edge is otherwise unretained by said recess, said locking member being maintained in its workpiece engaging position until after the workpiece is clamped between the spindles, and lock releasing means for causing said lock to release a workpiece upon initial withdrawal of said carrier from its clamping position and to shift out of its locking position when said carrier is in its loading position.

6. The machine tool of claim 3 wherein spindle locking means are provided for causing the angular position of the other of the two spindles to always be in the predetermined orientation during the workpiece loading and clamping operation.

7. In a machine tool wherein opposed faces of a workpiece to be operated upon are clamped between a pair of axially aligned rotatable spindles, one of which is longitudinally movable between an advanced workpiece-clamping position and a retracted workpiece-releasing position, the improved feeding mechanism for automatically feeding workpieces into a predetermined radial and angular orientation with the axis of the spindles, comprising:

a workpiece-holding magazine fixed to the tool for storing a plurality of workpieces in face to face relationship in a stack whose axis is parallel to but displaced from the axis of the machine tool spindles, said magazine including means for maintaining the workpieces in a predetermined angular orientation relative to the spindles, said magazine being positioned on the same side of a workpiece clamped between the spindles as is the longitudinally movable spindle, the magazine including biasing means for biasing said stack toward a workpiece loading end;

a workpiece transporting carrier slidably mounted on the tool for reciprocation along an axis perpendicular to the spindle axis between a loading position, where a workpiece is loaded from said magazine into said carrier, and a clamping position, where a workpiece is engaged and clamped between the machine tool spindles;

carrier reciprocating means mounted on the tool and connected to said carrier for reciprocating said carrier between said loading and clamping positions upon predetermined signals;

workpiece retaining means forming a portion of said carrier for releasably retaining a workpiece in said predetermined angular orientation as it is carried from said magazine to said spindles, said retaining means being aligned with and positioned immediately adjacent to said loading end of said magazine stack when said carrier is in said loading position to receive the endmost workpiece of the stack, and said carrier being thereafter movable by said reciprocating means to said clamping position wherein said workpiece retaining means portion of said carrier lies in the desired position relative to the spindle axis;

said workpiece retaining means portion of said carrier comprising a workpiece-receiving recess facing said magazine and having edges contoured to engage a portion of the circumferential edges of a workpiece to maintain the desired angular orientation of the workpiece, said recess being fully open on a first side facing said magazine and being normally closed on the opposite side by a retractable slide, said retractable slide being slidably mounted on said carrier in a direction parallel to the path of movement of said carrier and biased toward the recess-closing position, said retractable slide serving as a seat against which a workpiece bottoms as it is loaded into said recess from said magazine;

advance of said carrier towards said spindles causing said retractable slide to engage the stationary spindle and to retract into said carrier upon continued advance of said carrier to expose said opposite side of said recess, whereby the opposite faces of the workpiece become sufficiently exposed to permit clamping engagement between the spindles upon advance of said movable spindle to its workpiece clamping position.

8. The feeding mechanism of claim 7 wherein said carrier is further provided with a yieldable workpiece locking member normally biased toward a position to firmly engage the edge of a workpiece which faces forwardly toward the spindle axis, which edge is otherwise unretained by said recess, said locking member being maintained in its workpiece engaging position until after the workpiece is clamped between the spindles, and lock releasing means for causing said lock to release a workpiece upon initial withdrawal of said carrier from its clamping position and to shift out of its locking position when said carrier is in its loading position.

9. The Machine tool of claim 7 wherein spindle locking means are provided for causing the angular position of the other of the two spindles to always be in the predetermined orientation during the workpiece loading and clamping operation.

* * * * *